July 22, 1969   A. A. CLARK ET AL   3,456,511
STABILIZATION CONTROL SYSTEM
Filed Jan. 21, 1966   3 Sheets-Sheet 1

Inventors,
Albert A. Clark,
Allen G. Craig,
Benjamin Wilbur,
by John F. McDevitt
Their Attorney.

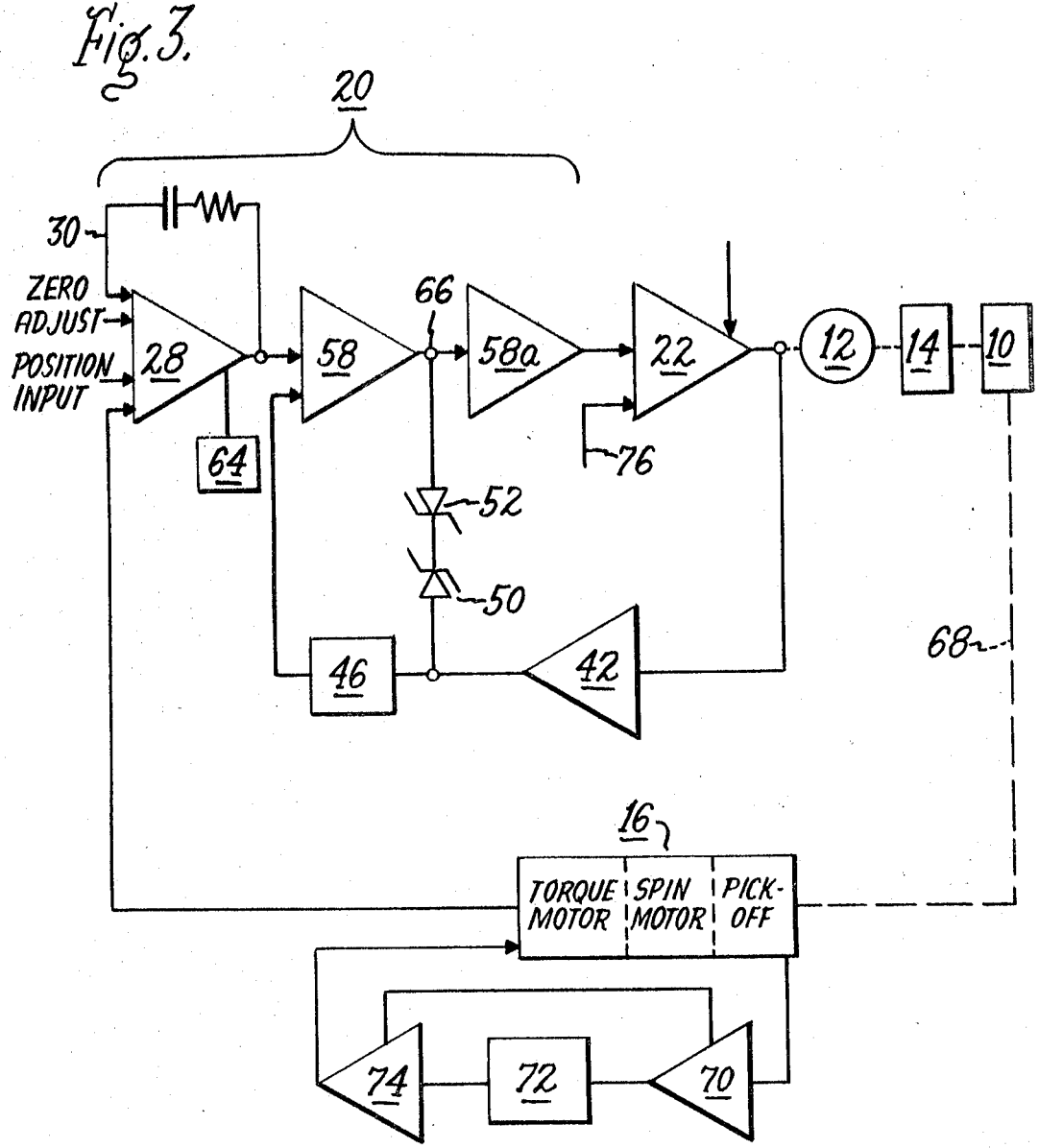

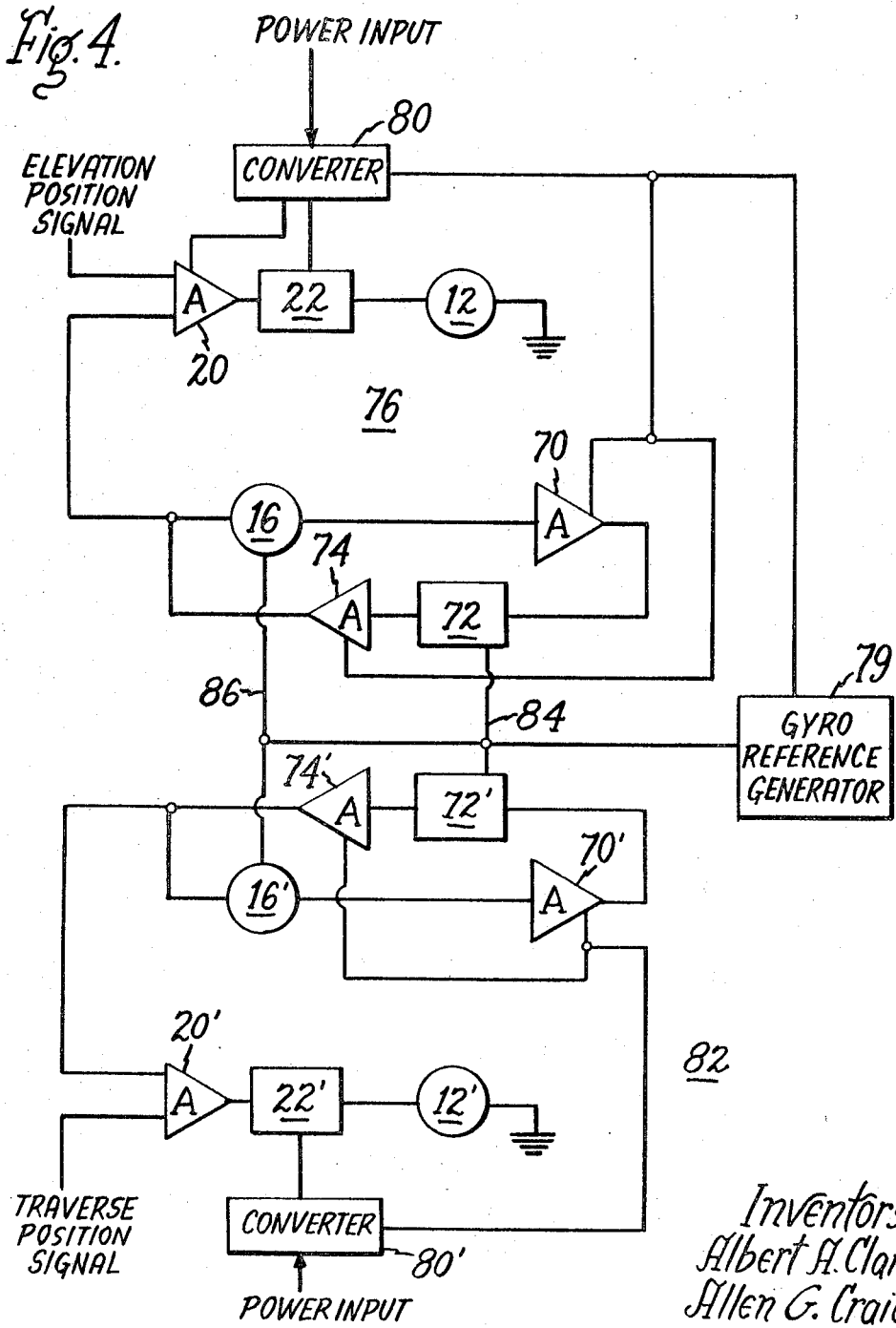

United States Patent Office

3,456,511
Patented July 22, 1969

1

3,456,511
STABILIZATION CONTROL SYSTEM
Albert A. Clark, Pittsfield, Allen G. Craig, Dalton, and Benjamin Wilbur, Pittsfield, Mass., assignors to General Electric Company, a corporation of New York
Filed Jan. 21, 1966, Ser. No. 522,237
Int. Cl. G01c *19/54, 19/28*
U.S. Cl. 74—5.4                                  9 Claims

ABSTRACT OF THE DISCLOSURE

A servo control for detecting platform movement includes a feedback signal indicative of platform movement. An input reference signal is fed into a servo amplifier along with the feedback signal to derive a D.C. output error signal. The servo amplifier also includes means to derive a current limit signal from a D.C. motor which is combined with the D.C. error signal to provide power amplifier with a stabilizing signal.

---

This invention pertains generally to a servomechanism control system. More particularly, the present invention relates to an electrical servomechanism system for automatically maintaining an inertia load at some predetermined inertial position. Specifically, the present invention relates to a high performance electrical servomechanism control system wherein a movable high inertia platform is stabilized against displacement by feedback elements associated therewith.

In conventional control systems of the type referred to, the high inertia load is stabilized in inertial space through a closed loop feedback system wherein disturbance motions applied to the load are counteracted by a servo drive motor connected thereto. A reversible DC motor serves as the prime mover for the inertia load and is supplied with electrical voltage of a polarity and magnitude which is dependent upon an error signal developed by comparison of a position input signal and a position feedback signal in a servo amplifier. Separate error signals are generally derived along with the principal spatial axis of the movable platform with one or more of the sensing means for detecting motion in space being directly connected to the platform in the conventional systems. The early control systems had the platform connected to the servo motor through speed reduction means which was generally a reduction gear train delivering the needed torque response. The mechanical power was delivered from a conventional high-speed motor geared down to a speed ratio in the range from 300:1 to 1000:1 which introduced many undesirable factors to high-performance servo control, including added inertia sometimes larger than the platform load, a source of backlash, spring and friction, as well as mechanical resonance in the gear train.

Elimination of the speed-reducing means in servo motor drives has been accomplished as disclosed in U.S. Patent No. 3,019,711 issued February 6, 1962, to Francis M. Bailey and Eugene B. Canfield and assigned to the assignee of the present invention. In that system a servo power drive controls a slow-speed rotary electric motor connected to the load by a continuous solid substantially rigid element. The direct drive motor differs from conventional high-speed servo motors in several important respects in order to provide a comparable torque response along with a desirably low inertial time constant. Conventional servo motors are characterized by relatively few armature conductors and a constant ratio between number of poles and number of parallel paths through the armature whereas the direct drive motor has a large number of armature conductors and a large number of poles. Quality servo motors have armatures shaped like rolling pins to minimize motor inertia as distinct from the usual pancake shape of the direct drive motor selected to satisfy the D²L requirements for torque response. The performance characteristics of the direct drive motor have resulted in its wide acceptance for precise servo applications.

It has now been found possible to obtain performance advantages heretofore deemed characteristic of the direct drive servo system although speed reduction means are used. Additionally, certain still desirable features imparted by the speed-reduction drive can be retained including lower weight and size than for a comparable direct drive prime mover. With such an approach, the optimum benefits derived from both type systems can be achieved.

It is an important object of this invention to provide a speed-reduction drive servomechanism control system for platform stabilization over a wide range of base motion frequency.

Another important object of this invention is to provide an improved speed-reduction drive servomechanism control system having little reflected inertia compared to the load inertia.

Still another important object of this invention is to provide a precision stabilization system for high inertia loads achieving a desirably higher mechanical resonant frequency than conventional geared drives.

These and other important objects of the invention are achieved with a closed loop servo system utilizing a reversible DC motor connected to the platform through speed-reduction means which is characterized by the inertia produced by the motor and speed-reduction means being only a minor percentage of the total system inertia. The inertia limitation is achieved with a minimum of torque multiplying elements consistent with satisfying the torque requirements for platform stabilization. In this manner, the entire drive train inertia is kept below a value requiring considerable power expenditure to accelerate the inertia of the motor and its associated speed-reduction means in order to prevent motion of the inertially stabilized platform. Said platform becomes isolated thereby from the harmful effect which base motion can impart through the drive train.

In a broad sense, practice of the present invention can be exemplified by reference to the accepted mathematical relationship defining inertia reflected by the drive train expressed below:

$$J_M = J_S \Gamma^2 \quad (1)$$

where $J_M$=motor plus speed-reduction means inertia referred to load (slug ft.²)
$J_S$=motor plus speed-reduction means inertia at the motor (slug ft.²)
$\Gamma$=gear ratio The total inertia of the system can also be represented by the following mathematical expression:

$$J_T = J_L + J_M \quad (2)$$

where $J_T$=total inertia of system (slug ft.²)
$J_L$=inertia for platform load (slug ft.²)
$J_M$=motor plus speed-reduction means inertia referred to load (slug ft.²)

When the ratio $J_M/J_T$ has a computed percentage value less than 15%, there will be little appreciable adverse effect upon the platform stabilization due to reflected inertia from the drive means. Precise stabilization has been achieved in a system studied with ratios in the range .05% to 5%. The speed-reduction ratio producing these results depends upon the motor inertia characteristics and system torque requirements as well as still other parameters for the particular application. Consequently, it is not possible to make completely adequate generalization regarding speed-reduction ratios for all systems. By way of further illustration only, gear ratios in the range from 40:1 to 4:1 have yielded the desired results in one slow-speed, high-stall torque servo motor system with lesser reflected inertia being produced at lower ratios. Increase of the platform load allows higher ratios to yield comparable results which still further reduce the criticality of specific ratios other than in accordance with the above general principles. The above generally described drive train is operatively associated with a means of detecting space motion and servo means for motor control to provide precise stabilization of the platform. The speed-reduction means of the drive train may be gearing or other known mechanical linkage, including crank and arm combinations and the like.

In its most basic configuration the present servo control system has the low-reflected inertia drive train coupled to the platform means, the space motion detection means providing a response signal indicative of platform movement, and the electrical servo portion of the system converting said response signal to provide a feedback stabilizing signal to the motor of said drive train. The electrical components and circuitry making up the closed loop servo portion of the control system are so constructed and connected that the platform is stabilized over a relatively wide frequency range of base input motion. Low-level amplification of the response signal is achieved in a servo amplifier which provides an error signal to a switching type power amplifier wherein the motor control signal is derived. The particular power amplifier in the system to be more fully described hereinafter permits wide bandwidth at servo response through use of a switching frequency significantly above the desired servo bandpass. Supplemental electrical feedback means can be included in the servo portion of the system for performance inprovement. A current feedback signal in the servo improves isolation between the motor and platform load at high frequencies for lower error in the servo response. Additional features may be incorporated in the servo control system which provide still further operational advantages. An integration circuit for the servo amplifier can provide position memory for the system wherein the platform returns to a pre-established spatial position after removal of transient disturbance torques exceeding the system torque capability. Likewise, a maximum current limit feature can be included in the circuitry for the servo portion of the system to prevent overloading the motor or power amplifier. The primary means of detecting space motion of the platform in the system can be an accelerometer, a gyroscope or like means.

In preferred form of the invention the servo control portion of the system derives an error signal from the position of the platform. Acceleration of the platform along its elevation and traverse axes is measured by one or more rate gyros affixed thereto. If the rate of movement in space, as measured by the one or more gyros is held to zero by the servo control portion of the system, the platform remains stationary in space. To move the platform to some other position in space a command signal can be fed to the servo components which then drive the platform until the rate, as measured by the one or more gyros, is equal to the command rate. The gyro signals feed into a servo amplifier which also receives the conventional input reference signal together with any command signals. A current feedback amplifier with associated network circuitry is connected in feedback relationship between the DC motor and the servo amplifier to help isolate the platform from base motion disturbance for improved stabilization. A shunt is advantageously located in the motor circuit to provide a current value porportional to the motor current thereby supplying an added feedback feature in the system. The network circuitry associated with the current feedback amplifier limits the peak current being supplied to the DC servo motor. The command gyro rate feedback, current feedback, and current limit signals are all combined in a manner hereinafter described in specific detail to provide a compensated and properly limited error signal to a DC power amplifier connected between the servo amplifier and servo motor. Said power amplifier is providing a polarity and amplitude of voltage to the motor as commanded by the servo amplifier. Utilization of a solid-state switching-type power amplifier in the system provides a low-time constant which together with the relatively low-time constant of the drive train in the system insures over-all precise control.

The drive train in the above-described high-bandpass servo-mechanism control system comprises the combination of a reversible DC motor coupled to a reduction gear train, which combination supplies the required torques for platform stabilization motions at the relatively low $J_M/J_T$ inertia ratios previously defined. The conventional high-speed servo motors which rotate at around 1800 r.p.m. and higher cannot be used by reason of excessive rotor inertia. To avoid the inherent high-rotor inertia in available reversible DC motors, it is necessary to employ a motor which supplies high torque at much slower speeds of around 300 r.p.m. or so. The inertia contributed by the motor itself in the $J_M$ term can thereby be kept to a suitably low value. Reducing motor speed lowers the ratio of the selected speed-reduction means which desirably reduces backlash and friction losses in the servo response. The specific comination of a slow-speed motor with speed reduction in the range 4:1 to 40:1 or so yields such relatively low $J_M$ values. There are still further servo performance advantages derived with lower $J_M$ values than can be obtained with conventional geared drives. More particularly, one added benefit of the lower $J_M$ value is a higher mechanical resonant frequency than for the conventional drives although gear train stiffness is not kept higher. Such benefit is apparent from a consideration of the energy transfer function relationship in a position servo system. The resonance frequency of the motor connected to the load by the gear train is given by:

$$W_n = \sqrt{\frac{(J_M + J_L)K_G}{J_M J_L}} \qquad (3)$$

where $W_n$=undamped resonance frequency (rad./sec.)
$J_M$=motor plus speed-reduction means inertia referred to load (slug ft.$^2$)
$J_L$=load inertia (slug ft.$^2$)
$K_G$=spring constant of the gear train (lb. ft./rad.)

Thus, with a given stiffness ($K_G$) and load inertia ($J_L$) it follows from Equation 3 that resonant frequency increases as $J_M$ becomes smaller. Higher bandwidth servo systems are provided in this manner than can be obtained with available high-speed motors thereby making the present invention broadly useful for diverse application.

It is not intended to limit the present invention, however, to the particular combination of a low-speed motor and the above-indicated speed-reduction ratios. Since servo performance improvement is obtained at relatively low $J_M$ values compared with conventional speed-reduction drives, it becomes apparent that one other means exists to obtain like results. Elimination of the high-rotor inertia which characterizes conventional high-speed servo motors makes it possible to employ higher speed-reduction ratios without materially increasing the $J_M$ value. Whereas higher gear ratios are expected to increase friction and backlash in the servo system, any disadvantage could be offset in a particular application by lower torque required for the motor as well as improved efficiency because of the higher motor speed. From these considerations, it follows that drive train requirements for the invention are met so long as the cumulative value of the motor inertia plus inertia of the speed-reduction means is maintained at some minor percentage of the system inertia in the platform and load. Future availability of high-speed DC reversible motors characterized by low-rotor inertia and which develop significant output torque at higher speeds, makes the alternative combination possible. In its broadest sense, therefore, the present invention contemplates speed-reduction drive servo systems wherein the $J_M$ value always is small compared to the $J_T$ term which is surprising in view of the servo design maxim that system performance is compromised significantly with use of speed-reduction means.

The invention may be practiced in its preferred embodiments, as hereinafter more fully described, taken in connection with the accompanying drawings in which:

FIGURE 3 is a more detailed block diagram illustrating the principal servo response elements which comprise the control system of FIGURE 1; and FIGURE 4 is a block diagram for a two-axis control system of the invention.

Figure 1:
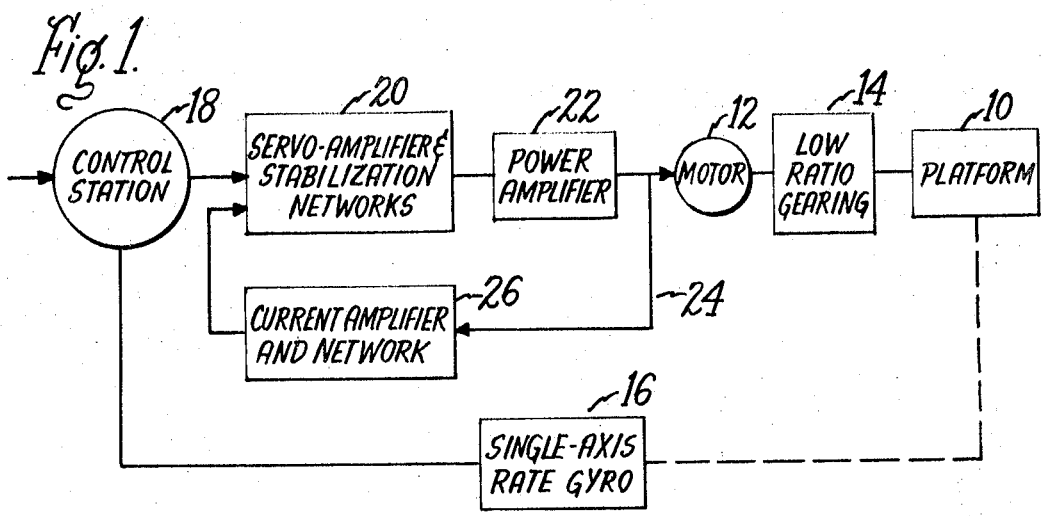
FIGURE 1 is an electromechanical block diagram of a servo system in accordance with the invention for stabilizing platform motion along one axis.

In all the above drawings, like reference numerals indicate like elements for greater clarity in understanding the invention. FIGURE 1 illustrates the invention, in a preferred embodiment for high disturbance torque applications, wherein a single-axis rate gyro measures the rate and velocity of motion by having its sensitive axis aligned with respect to either the elevation or traverse platform axis. Preferably, a second rate gyro will be aligned with its sensitive axis mutually perpendicular to the said first gyro axis. The defined gyro arrangement is commonly employed for two-axis stabilization of the platform wherein separate error signals for the traverse and elevation axes drive individual drive trains in a like manner specifically described hereinafter. Since essentially the same servo response elements are used for this purpose along each stabilized axis, it is necessary to consider but a single axis arrangement. Accordingly, the elevation axis position of a platform 10 is maintained by a reversible low-speed DC motor 12 which is coupled thereto by a reduction gear train 14 so as to drive the platform with a small motor and gearing inertia when compared to the mass being stabilized. A single-axis rate gyro 16 is rigidly affixed to the platform to provide a rate signal proportional to its movement in space. The rate gyro is preferably of the integrating type for greater precision compared to the conventional rate gyro. A particularly precise form of rate integrating gyro is described in U.S. Patent 3,203,259, issued Aug. 31, 1965, to H. H. P. Lemmerman and assigned to the assignee of the present invention. Said latter device has a viscous damping feature which in conjunction with a variable orifice holds damping relatively constant over a wide temperature range without requiring temperature control. Position stabilization is achieved in the embodiment by having the rate signals as measured by both gyros held to zero by the respective servo elements, thereby maintaining the platform at some predetermined spatial attitude. This is accomplished through a comparison of pickoff signals from the gyros followed by generation of torques about the various gyro axes until all signal derivatives have been substantially eliminated. In FIGURE 1 only the servo loop for the elevation axis has been shown for clarity of illustration and it follows that a duplicate arrangement may be employed for traverse axis stabilization. Alternately, different speed-reduction means may be utilized in the drive train for stabilization along a particular axis depending upon the applicable performance criteria. For example, a crank and arm linkage coupled to a servo motor provides suitable speed reduction along an axis where only limited motion is experienced.

Control station 18 provides a junction point in the servo control loop for admitting command signals when it is desired to drive the platform from its inertially stabilized position to some other spatial orientation. The DC position input signals are fed to the servo amplifier 20 which provides a combined error signal to the power amplifier 22 from the position input, gyro, and current feedback inputs. When there is no position input signal being supplied to the servo amplifier, its output will consist of stabilizing signals to counteract any disturbance motions of the platform. In the driven mode of operation the gyro continues to measure displacement of the gyro spin axis from its zero reflection position and the drive train moves the platform until the rate signals of the gyro and position input are equal. A current feedback loop 24 derives a continuous signal from a shunt in the servo motor circuit which is proportional to the motor current. The current feedback signal is amplified in an amplifier 26 having an associated network to limit the maximum current to the servo motor and provide close followup of motor speed for rapid servo response.

In operation, the gyro rate signal is combined with the adjusted current feedback signal in the servo amplifier to provide an output error signal which is fed directly to the power amplifier controling the servo motor. This represents a simplification from known servo systems utilizing a combined gyro and current feedback wherein the gyro rate signal is differentiated before combination with a current feedback signal. Combination of the signals as disclosed in the embodiment has significant performance advantage especially torque response with little to no increased system cost. If an integrating circuit is provided as the low first stage of the servo amplifier, there is obtained the additional advantage of position memory and high gain at low-motion frequency.

Figure 2:
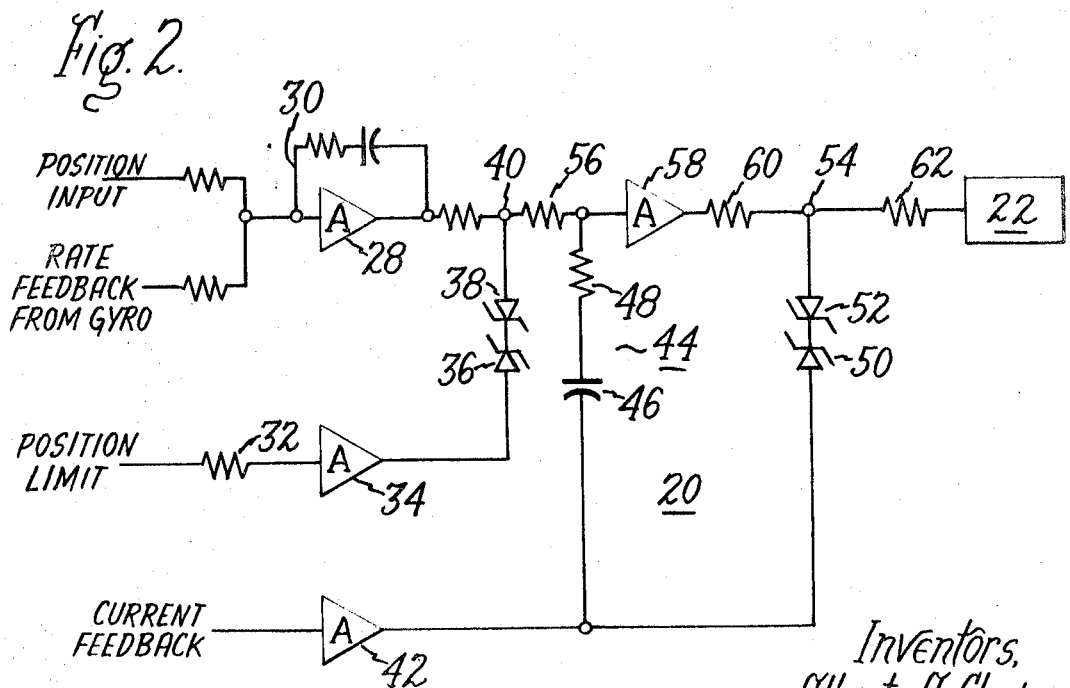
FIGURE 2 is a block diagram for the servo amplifier of FIGURE 1.

In FIGURE 2 there is shown a preferred servo amplifier for the FIGURE 1 embodiment. Basically, amplifier 20 combines the position input (command) signal, the gyro rate signal, the current feedback signal and a current limit signal to provide a stabilized compensated and properly limited signal to the power amplifier. An integration circuit feature in the servo amplifier provides position memory for automatic return to a commanded position in the event disturbance torques exceed servo motor ratings. Accordingly, the position input signal and the gyro rate signal are applied directly to a pre-amplifier stage 28 having associated therewith a feedback loop circuit 30 for high gain at low frequency. Thus, errors due to load or external torque, base motion and the servo amplifier drift remain small. A position limit signal which may be obtained conveniently from a tachometer and potentiometer (not shown) associated with the servo motor is fed through resistor 32 to DC amplifier 34 with the amplifier output signal being in the form of a DC voltage indicative of platform location and velocity with respect to some predetermined position limits. The amplifier output signal is transmitted to a pair of Zener diodes 36 and 38 associated in deadband arrangement to limit the voltage signal value at junction point 40. The voltage signal at said junction point is thereby proportionally reduced as the platform approaches its position limits in order to reduce platform velocity thereat. A current feedback signal from the servo motor circuit (not shown) is amplified in DC amplifier 42 with the amplifier output signal being fed to network 44. The function of said network is to filter the signal through a lead circuit including a series connected capacitor 46 and resistor 48 in order to fix the inertial time constant for the servo motor. In this fashion, the current feedback signal helps shape the transfer function to stabilize the servo. A maximum current limit for the servo motor is provided by passing the current feedback signal from DC amplifier 42 through a second set of Zener diodes 50 and 52. Said latter diodes are again associated in deadband arrangement and limit the signal value at junction point 54. Consequently, both voltage and current signals from the servo amplifier have been regulated to avoid placing undue torque or electrical demands on the servo motor. At junction 40, the integrated gyro rate signal and position input signal are combined with the position limit signal and fed across resistor 56 to a DC summing amplifier 58. A further input signal to the summing amplifier is the adjusted current feedback signal received from the lead filter 44. The combined output signal from the summing amplifier is fed across resistors 60 and 62 to provide a properly limited input error signal to the power amplifier 22.

In operation, the servo amplifier includes a memory feature which permits automatic return of the platform to some previously commanded position after the platform has been driven into the position limits. Upon removal of the conditions causing a position limit to be reached, the platform automatically returns to the commanded position. The signal limit features of the servo amplifier prevent demands for high torques and currents when the platform has reached a position limit.

FIGURE 3 is a detailed block diagram of essential servo response elements for the control system of FIGURE 1. In the FIGURE 3 embodiment, it will be noted that DC summing amplifier 58 has been divided into two portions (58 and 58a) which permits feeding a current limit signal to said amplifier at known impedance levels. An additional feature in the 58a portion of said amplifier is an associated lead network to adjust output signal gain at various frequencies. The functions of all lead networks in the embodiment is to reduce mechanical resonance in the servo response by reducing servo loop gain at frequencies associated with the mechanical resonances. Accordingly, a position input signal along with the gyro rate signal and a zero adjustment signal are supplied to the pre-amplifier stage 28 of servo amplifier 20. Said preamplifier portion includes a lead network 30 for high signal gain at low frequency. A notch filter 64 in the pre-amplifier inhibits flow of the amplified signal at unwanted frequencies. The filtered output signal proceeds to summing amplifier portion 58 for combination with the current feedback signal as hereinbefore described. The current feedback signal is amplified in DC amplifier 42 with the amplified signal being fed through lead network 46 before input to the summing amplifier. A current limit signal is derived from the amplified current feedback signal by connecting a lead from the output side of the current feedback amplifier to a junction point 66 which interconnects the two portions 58 and 58a making up the summing amplifier. A pair of Zener diodes 50 and 52 in the current limit circuit path prevents the signal value at junction point 66 from exceeding that fixed by the maximum Zener voltage rating. Optionally, network 42 may include other circuitry including differential amplifier means (not shown) for deriving an error signal between the amplified current signal and the output signal from summing amplifier portion 58a. The modified arrangement provides even closer accuracy of servo response. The gyro rate feedback signal to pre-amplifier stage 28 is initiated by electrical indications from the pick-off and torque motor elements of a conventional integrating rate gyro 16. The pickoff elements (not shown) provide velocity and position information with respect to the platform as shown schematically in the embodiment by dotted line 68. The pickoff response is an AC signal which is amplified in gyro output amplifier 70 and then demodulated in phase sensitive demodulator 72 to produce a DC rate signal. The DC rate signal is fed into DC amplifier 74 and then fed with the torque motor signal of the gyro to pre-amplifier stage 28. The described integrating rate gyro arrangement provides the primary feedback means of the servomechanism control system and serves to automatically stabilize the platform against disturbance torques and base motion.

The combined error signal produced in summing amplifier portion 58 is properly limited at junction point 66 for further amplification in amplifier portion 58a of the servo amplifier. The final output signal of the servo amplifier constitutes a stabilized compensated and properly limited error signal that drives power amplifier 22. To achieve wide servo bandwidth in the system along with electrical efficiency, a solid-state, switching-type power amplifier is employed. The wide bandwidth is achieved by utilizing a switching frequency substantially above the desired servo bandpass. The average voltage applied to servo motor 12 from said power amplifier is determined by the ratio of switch-on time to switching period. To cause the servo motor to rotate in one direction certain switches in the power amplifier are closed at some switching frequency. A frequency reference signal 76 is added to the input error signal as the means for control of the power amplifier.

In operation, the DC servo amplifier sums the gyro rate signal and command signal for combination with the current feedback signal to provide an error signal which controls a switching-type power amplifier. The gyro feedback means of the system includes a DC amplifier which drives the gyro output amplifier. The error signal from the servo amplifier is combined with a frequency reference signal to operate the power amplifier such that output voltage to the servo motor varies with switch-on time. Rotational direction of the reversible DC servo motor is regulated by the selection of switches being closed in the power amplifier. At zero error signal, the amplifier switches are turned off. The servo motor is coupled to platform 10 with reduction gearing 14 such that combined motor and gearing inertia is small compared to the load inertia of platform 10. Automatic platform stabilization is achieved with great accuracy in the embodied construction as well as the ability to precisely elevate and traverse the platform.

FIGURE 4 is a servo block diagram for a two-axis servo mechanism control system embodying the invention. Only the rate gyro stabilization portion of the system is shown for ease in understanding the manner of common electrical connection between the elevation and traverse servo drives. Basically, the drawing comprises an electrical circuit diagram for the interconnected rate gyros utilized to inertially stabilize and drive the associated platform along the elevation and traverse axis. A pair of integrating rate gyros aligned mutually perpendicular to each other along the respective gyro spin axes and positioned in a gyro block mechanically coupled to the platform provides the necessary velocity signals. Like numerals have been employed to designate duplicate components in the individual drive units making up the composite system.

The elevation drive unit 76 comprises an integrating rate gyro 16 combined with servo elements so as to control the position of the platform (not shown). The gyro develops a signal proportional to the position of its input axis in space which, in conjunction with the gyro torque motor and associated servo response elements, applies a torque about the gyro output axis in order to rotate or align the gyro about its input axis in space. When the platform reaches the desired position, it will retain this position automatically by gyro stabilization. The gyro reference generator 79 drives the spin motor (not shown) of the gyro. Accordingly, an elevation input signal is combined with the gyro feedback signal in servo amplifier 20. A converter 80 regulates the DC power supply to all amplifiers in the servo unit. The combined error signal from the servo amplifier controls the switching power amplifier 22 which drives servo motor 12. The gyro feedback circuit comprises integrating rate gyro 16 associated with a gyro output amplifier 70, a phase-sensitive demodulator 72 and a DC amplifier 74 so as to provide a signal proportional to rate in inertial space. The rate signal is a combined output of signals initiated with the integral pickoff and torque motor elements (not shown) of the gyro. The AC pickoff signal is amplified in gyro output amplifier 70, then demodulated in a phase-sensitive demodulator 72 which determines both polarity and amplitude of the input signal, and the demodulated signal fed into a DC amplifier. The resultant DC signal is combined with the torque motor output signal to provide the rate error signal to servo amplifier 20. The gyro reference generator 79 provides a frequency reference signal to the demodulator in the embodied construction.

A like combination of servo elements comprises the principal feedback means of the traverse drive unit 82. Like elements in the traverse unit bear the same numerical identification in the drawing as elevation elements except for added prime designations. Thus, gyro 16 in the elevation unit becomes gyro 16' in the traverse unit to indicate a substantial duplication of the component. The circuit path configuration of the traverse unit is also a duplicate of the elevation unit circuit which makes further description thereon unnecessary. There remains but the common circuit connections between the two units which serve mainly to supply signals of the same value to otherwise independently operating circuit components. The common circuit paths originate from gyro reference generator 79 which drives the torque motors for the gyros and supplies a frequency reference signal to the demodulators. For simplicity of illustration, said reference generator has been shown only in block diagram form with known embodiments of the device comprising an LC oscillator, phase splitter, and amplifiers with transformer coupled outputs to provide the described functionality. The signal to the demodulators is transmitted over lead 84 while the signal to the gyro torque motors proceeds via lead 86. Each gyro and demodulator is thereby operated completely independent of its counterpart.

While the invention has been described in its preferred embodiments, it will be apparent that other modifications can be made without departing from the scope and true spirit of the invention. For example, it is contemplated that a three-axis system can be constructed utilizing the principles of the invention if it becomes necessary to exercise precise control about all principal platform axes.

What is claimed as new and desired to be secured by Letters Patent of the United States is:

1. A servo control system for stabilizing an inertia load at some predetermined position which comprises:
    (a) a movable platform having reversible DC motor means coupled to said platform by speed-reduction means such that the inertia of the motor and speed-reduction means is small compared to the load inertia;
    (b) space motion detection means providing a feedback signal indicative of platform movement;
    (c) switching power amplifier means for applying electrical energy to said DC motor in response to a stabilizing signal such that the average voltage to said motor varies with switching time and rotational direction of said motor is controlled by selection of semiconductor switching elements in said power amplifier;
    (d) servo amplifier means to derive an output DC error signal by combining the feedback signal from the space detection means with an input reference signal; and
    (e) said servo amplifier means including current limit circuit means which senses the magnitude of current flowing in the motor and derives a current limit signal therefrom which is combined with the output DC error signal from the servo amplifier to provide the stabilizing signal to the power amplifier.

2. A servo control system as set forth in claim 1 wherein the means of detecting platform movement provides a feedback rate signal proportional to platform velocity in space which is combined with the input reference signal for application to the servo amplifier.

3. A servo control system as set forth in claim 1 wherein the speed-reduction means comprises reduction gearing connected between a high-stall torque, slow-speed, reversible DC motor and the platform, the means of detecting platform movement in space comprises gyro feedback means providing a feedback rate signal proportional to platform velocity which is combined with the input reference signal for application to the servo amplifier, and the current limit circuit means is also connected to the input side of the servo amplifier to provide a current feedback signal for isolation between the motor and platform feed.

4. A servo control system as set forth in claim 1 wherein the means of detecting platform movement in space comprises gyro feedback means providing a feedback rate signal proportional to platform velocity which is combined with the input reference signal for application to the servo amplifier together with means for directing platform movement to some desired position by furnishing a command rate signal to the servo amplifier which drives the platform until the gyro rate signal equals the command rate signal.

5. A servo control system as set forth in claim 1 wherein the means of detecting platform movement in space comprises gyro feedback means providing a feedback rate signal proportional to platform velocity which is combined with the input reference signal for application to the servo amplifier together with means for directing platform movement to some desired position by furnishing a command rate signal to the servo amplifier which drives the platform until the gyro rate signal equals the command rate signal, and means for supplying a position limit signal to the servo amplifier which indicates platform location with respect to a predetermined position.

6. A servo control system for stabilizing an inertia load at some predetermined position which comprises:
    (a) a movable platform having reversible DC motor means coupled to said platform by speed reduction means such that the inertia of the motor and speed-reduction means is small compared to the load inertia;
    (b) space motion detection means providing a feedback signal indicative of platform movement;
    (c) switching power amplifier means for applying electrical energy to said DC motor in response to a stabilizing signal such that the average voltage to said motor varies with switching time and rotational direction of said motor is controlled by selection of semiconductor switching elements in said power amplifier;
    (d) servo amplifier means to derive an output DC error signal by combining the feedback signal from the space detection means with an input reference signal;
    (e) said servo amplifier means including current limit circuit means which senses the magnitude of current flowing in the motor and derives a current limit signal therefrom which is combined with the output DC error signal from the servo amplifier to provide the stabilizing signal to the power amplifier; and
    (f) said servo amplifier means also including voltage limit circuit means which applies a voltage signal to the servo amplifier to reduce the output DC error signal as the platform approaches predetermined position limits.

7. A servo control system as in claim 6 wherein the feedback signal from the space detection means is combined with a current feedback signal derived in the current limit circuit means and the voltage limit signal to provide an input signal to the servo amplifier.

8. A servo control system as in claim 6 wherein the servo amplifier includes a DC summing amplifier having a first and second output stage connected in series for combining the feedback signal from the space detection means with the voltage limit signal as an input signal to said first output stage and combining the output signal from said first stage with the current limit signal as an input signal to said second output stage.

9. A servo control system for stabilizing an inertia load at some predetermined position which comprises:

(a) a movable platform having a high-stall torque, slow-speed reversible DC motor coupled to said platform by reduction gearing such that the inertia of said motor and reduction gearing is small compared to the load inertia;

(b) rate gyro feedback means providing a feedback signal proportional to platform rate of movement in space;

(c) switching power amplifier means for applying electrical energy to said DC motor in response to a stabilizing signal such that the average voltage to said motor varies with switching time and rotational direction of said motor is controlled by selection of semiconductor switching elements in said power amplifier;

(d) servo amplifier means to derive an output DC error signal for application to the power amplifier which servo amplifier means including a DC summing amplifier having a first and second output stage connected in series;

(e) said servo amplifier means including current limit circuit means which senses the magnitude of current flowing in the motor and dervies a current limit signal therefrom which is combined with the output DC error signal from the DC summing amplifier to provide the stabilizing signal to the power amplifier;

(f) said current limit circuit means also deriving a current feedback signal for application to the input side of the servo amplifier;

(g) said servo amplifier means also including voltage limit circuit means which applies a voltage signal to the servo amplifier to reduce the output DC error signal as the platform approaches predetermined position limits; and (h) said rate feedback signal being combined with the voltage limit signal as an input signal to said first output stage of the DC summing amplifier and the current limit signal being combined with the output signal from said first stage to provide the input signal to said second stage of the DC summing amplifier.

References Cited

UNITED STATES PATENTS

| | | | |
|---|---|---|---|
| 3,068,705 | 12/1962 | Tilly et al. | 74—5.4 |
| 3,077,553 | 2/1963 | Borghard et al. | 74—5.4 |
| 3,301,070 | 1/1967 | Lapierre | 74—5.4 |

FRED C. MATTERN, Jr., Primary Examiner

MANUEL ANTONAKAS, Assistant Examiner

U.S. Cl. X.R.

74—5.6; 244—77